UNITED STATES PATENT OFFICE.

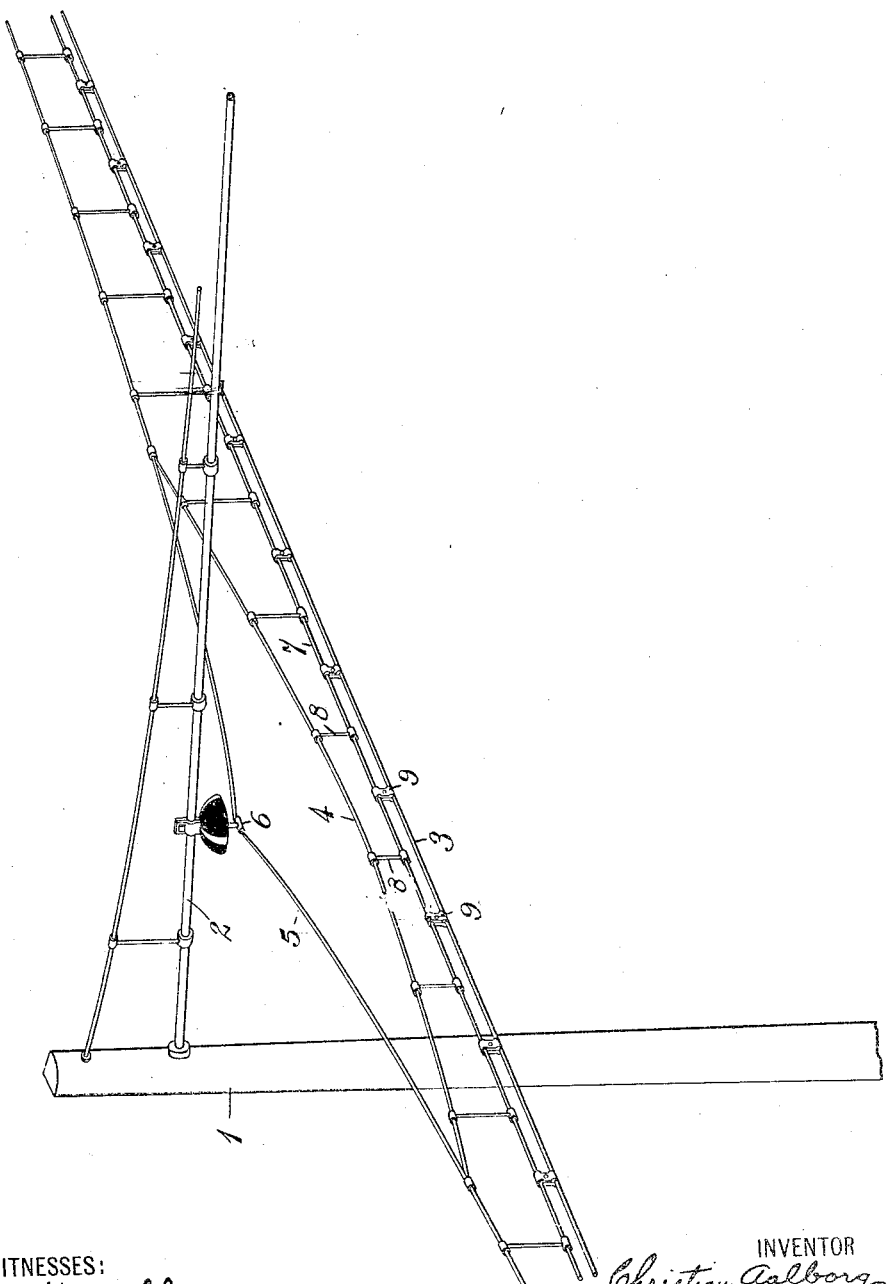

CHRISTIAN AALBORG, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC-LINE STRUCTURE.

1,055,691.

Specification of Letters Patent. Patented Mar. 11, 1913.

Application filed April 21, 1910. Serial No. 556,879.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Electric-Line Structures, of which the following is a specification.

My invention relates to electric line structures, and it has for its object to provide a simple and durable structure of this class that shall be particularly adapted for application to electric railway trolley lines.

In order to support the trolley wire in a substantially horizontal plane, a so-called catenary structure has frequently been employed for electric railways. According to this form of structure, a messenger wire or cable is supported at frequent intervals and is allowed to sag to a greater or less degree, the trolley wire being suspended therefrom at frequent intervals by means of hangers of different lengths.

In carrying out my present invention, I employ a catenary structure, but, in order to avoid excessive wear between the trolley wire and the traveling contact device of an electric car or other railway vehicle by providing an increased flexibility of structure, I suspend the portions of the trolley wire that are beneath and adjacent to the rigid overhead supports from lengths of wire or cable the ends of which are attached to the messenger cable.

The single figure of the accompanying drawing is a perspective view of a section of an overhead structure for electric railways embodying my invention.

Referring to the drawing, the structure here shown comprises a substantially vertical pole or supporting member 1 to which a rigid bracket arm or span device 2 is secured, a trolley wire 3 and a messenger wire or cable 5, which is suspended from an insulated bracket 6 on the arm 2. An auxiliary wire or cable 4, the ends of which are attached to the messenger cable 5, hangs in a catenary curve below the bracket 6 which is insulated from and is adjustably mounted upon the arm or span device 2.

By the use of my invention the necessity for employing long hangers adjacent to the points of messenger wire support is obviated.

As shown in the drawing, the trolley wire 3 is indirectly suspended from the messenger wire 5 and the auxiliary wire 4 in order to increase the flexibility of the trolley wire, but the intermediate wire 7, which is suspended from the messenger wire and the auxiliary wire by means of hangers 8, and from which the trolley wire 3 is yieldingly suspended by means of hangers 9, may be omitted without departing from my invention.

My invention is especially applicable to electrified sections of steam railroads or to other installations in which steel bridges or other substantial supports are provided at relatively great distances apart.

I desire that variations which do not depart from the spirit of my invention shall be included within its scope.

I claim as my invention:

1. An overhead line structure comprising a stationary support, a messenger wire or cable secured thereto, an auxiliary wire or cable hanging below the stationary support and secured at its ends to widely separated points in the messenger wire or cable and a trolley conductor suspended at frequent intervals from the messenger wire or cable and the auxiliary wire or cable.

2. An overhead line structure comprising a stationary support, an insulator mounted thereon, a messenger wire or cable secured to the insulator, an auxiliary wire or cable secured at its ends to widely separated points in the messenger wire or cable and hanging in a catenary curve below the insulator and a trolley conductor suspended from the messenger wire or cable and the auxiliary wire or cable.

3. An overhead line structure, comprising a stationary support, a messenger wire or cable secured thereto, an auxiliary wire or cable hanging under the stationary support and secured at its ends to widely separated points in the messenger wire or cable and a conductor suspended from both of said wires or cables.

In testimony whereof, I have hereunto subscribed my name this 31st day of March, 1910.

CHRISTIAN AALBORG.

Witnesses:
D. A. BOWEN,
B. B. HINES.